US006141401A

United States Patent [19]

Gerling

[11] Patent Number: 6,141,401
[45] Date of Patent: Oct. 31, 2000

[54] DRIVE DEVICE FOR A ROTARY ANODE OF AN X-RAY TUBE, AND METHOD OF CONTROLLING THE DRIVE DEVICE

[75] Inventor: Dieter Gerling, Aachen, Germany

[73] Assignee: U.S. Philips Corporation, New York, N.Y.

[21] Appl. No.: 09/198,709

[22] Filed: Nov. 24, 1998

[30] Foreign Application Priority Data

Nov. 25, 1997 [DE] Germany .......................... 197 52 114

[51] Int. Cl.$^{7}$ ................................ H01J 35/10; H02P 1/26

[52] U.S. Cl. ............................ 378/131; 378/91; 318/779; 318/802

[58] Field of Search ................................ 378/91, 93, 131; 318/778, 779, 780, 798, 799, 800, 801, 802, 803, 804, 805, 806, 807, 808, 809, 810, 811

[56] References Cited

U.S. PATENT DOCUMENTS

| | | | |
|---|---|---|---|
| 3,641,408 | 2/1972 | Fiocca | 318/758 |
| 4,065,673 | 12/1972 | Fiocca | 378/93 |
| 4,107,535 | 8/1978 | Kotabe et al. | 378/93 |
| 4,713,594 | 12/1987 | Bose et al. | 318/685 |
| 4,760,588 | 7/1988 | Shaw | 378/93 |
| 4,999,560 | 3/1991 | Morishima et al. | 318/779 |
| 5,265,146 | 11/1993 | Wirth et al. | 378/91 |
| 5,339,348 | 8/1994 | Wirth et al. | 378/91 |
| 5,490,198 | 7/1998 | Gerling | 378/131 |
| 5,760,556 | 8/1978 | Hamilton, Jr. et al. | 318/438 |
| 5,774,625 | 8/1978 | Vogler | 378/94 |

*Primary Examiner*—David P. Porta
*Assistant Examiner*—Drew A. Dunn
*Attorney, Agent, or Firm*—Dwight H. Renfrew

[57] ABSTRACT

The invention relates to a drive device for a rotary anode of an X-ray tube, including an induction motor (13) whereto an alternating voltage can be applied by means of an inverter (20), and also including a control unit (22) for controlling the inverter (20), the switching frequency of the inverter (20) being variable in time, in conformity with a frequency time characteristic, by means of the control unit (22). It is the object of the invention to provide a drive device for a rotary anode of an X-ray tube as well as a suitable control method which ensures the temperature-independent starting up of the rotary anode. The invention is characterized in that in order to start up the rotary anode to an operating speed independently of the operating temperature of the rotor (12), a fixed, selectable starting up characteristic is provided as the frequency time characteristic, that the starting-up characteristic has at least a low-temperature segment (II) and at least a high-temperature segment (I), the mean slope of the starting up characteristic in the low-temperature segment (II) being optimized for the lower operating temperature range while it is optimized for the upper operating temperature range of the rotor (12) in the high-temperature segment (I).

8 Claims, 4 Drawing Sheets

DRIVE DEVICE FOR A ROTARY ANODE OF AN X-RAY TUBE, AND METHOD OF CONTROLLING THE DRIVE DEVICE

BACKGROUND OF THE INVENTION

1. Field of the Invention

The invention relates to a drive device for a rotary anode of an X-ray tube, including an induction motor whereto an alternating voltage can be applied by means of an inverter, and also including a control unit for controlling the inverter, the switching frequency of the inverter being variable in time, in conformity with a frequency time characteristic, by means of the control unit.

2. Description of Related Art

A drive device of this kind is known, for example for the X-ray tubes of the Philips series "Super-Rotalix". The rotary anode of this known X-ray tube is driven by means of an asynchronous motor which is fed via an inverter. The rotor of the asynchronous motor, being coupled to the rotary anode of the X-ray tube, is accommodated inside the vacuum envelope of the X-ray tube and hence is subject to large temperature fluctuations. In the X-ray mode, i.e. when the electron rays are incident on the rotary anode, the rotor is heated to a temperature as high as 350° C. Outside the X-ray mode, the rotor temperature decreases to substantially room temperature after a sufficiently long cooling down period.

The electrical resistance of the rotor also varies as a function of the fluctuations of the rotor temperature and hence also the electrodynamic properties of the asynchronous motor, notably its starting-up behavior.

In order to ensure uniform starting up of the rotary anode of the X-ray tube, irrespective of the relevant rotor temperature and the rotor resistance resulting therefrom, the known X-ray tube is provided with a temperature monitoring circuit which calculates the temperature of the rotor from the operating characteristics of the X-ray tube on the basis of mathematical models. The calculated temperature is applied to a control unit which controls the switching frequency of the inverter. During starting up of the asynchronous motor, the switching frequency of the inverter is controlled in a temperature-dependent manner by means of the control unit, i.e. in conformity with the relevant temperature of the rotor, and use is made of different frequency time characteristics, each of which ensures that a minimum number of revolutions is reached after an adjustable starting-up period.

The construction of such a temperature monitoring circuit is very complex and intricate.

SUMMARY OF THE INVENTION

It is an object of the invention to provide a different drive device for a rotary anode of an X-ray tube as well as a method of controlling it while ensuring a more temperature-independent starting up of the rotary anode of the X-ray tube.

With respect to the drive device this object is achieved according to the invention in that in order to start up the rotary anode to an operating speed a fixed, selectable starting up characteristic which is independent of the operating temperature of the rotor is provided as the frequency time characteristic, and that the starting up characteristic has at least a low-temperature segment and at least a high-temperature segment, the mean slope of the starting up characteristic in the low-temperature segment being optimized for the lower operating temperature range of the rotor while it is optimized for the upper operating temperature range of the rotor in the high-temperature segment.

Throughout the operating temperature range of the rotor, for example from 20° C. to 350° C., the fixed, selectable starting up characteristic is always used for the starting up of the rotary anode. At any instant of the starting up phase of the rotor, therefore, a defined frequency is thus imposed in conformity with the starting up characteristic, which frequency is adjusted, using the control unit, in dependence on time but independently of the operating temperature of the rotor. The starting up characteristic is chosen so that the operating speed is reached in essentially the same starting up time, independently of the actual operating temperature of the rotor. For example, the starting up characteristic can be chosen so that an operating speed in a range of from 8000 rev./min. to 9000 rev./min. is reached after a starting up period of 1.8 s.

A drive device of this kind offers the advantage that the switching frequency is controlled fully independently of the rotor temperature and that, therefore, an intricate temperature monitoring circuit can be dispensed with. Moreover, a drive device of this kind is highly fail-safe, because it is not dependent on any external control variables and is used for all temperatures of the operating temperature range of the rotor. Thus, the starting up characteristic can be permanently stored in a memory of the control unit so that it can be read out whenever the rotary anode is started up.

In the high-temperature segment the starting up characteristic is chosen so that optimum starting up is achieved for high rotor temperatures. Thus, in the high-temperature segment the starting up characteristic has not been adapted to a motor with a cold rotor, so that in the case of a cold rotor the torque decreases as a function of time in the high-temperature segment.

In the low-temperature segment, however, the starting up characteristic has been optimally adjusted for rotors with a lower operating temperature and hence is not optimum for rotors with a higher temperature.

The two different segments of the characteristic thus provide compensation for the different starting up behavior of the rotor due to different rotor temperatures. This results in an essentially equal starting up time at different rotor temperatures while using the same starting-up characteristic.

The attractive embodiment of the invention in which a high temperature segment precedes a low temperature segment is advantageous notably for drive devices which enter the field weakening range during the starting up to the operating speed. The field weakening range is the range in which the magnetic field or the magnetic flux in the motor drops below the nominal value for which the motor is designed. Because induction motors require a higher voltage at high rotor temperatures, due to the higher winding resistance, and hence enter the field weakening range sooner during starting up than motors with a lower temperature, it is advantageous when the starting up characteristic has the high-temperature segment as its first segment in time and is thus adapted first to the hot motor. For high rotor temperatures the drive thus has an essentially constant, high torque in the range of the high-temperature segment. Because the starting up characteristic has not been adapted to the cold motor in the high-temperature segment, the torque of the cold motor decreases as a function of time. Consequently, at the end of the high-temperature segment the motor with a higher temperature has a higher number of revolutions than the motor with a lower temperature. In conformity with the advantageous embodiment described in claim 2, the high-temperature segment is succeeded in time by a second segment which is a low-temperature segment. In this low-temperature segment the starting up characteristic has been adapted to the cold motor, so that the torque of the cold motor increases while the torque of the hot motor decreases.

The three-segment configuration of the starting up characteristic with a high temperature segment followed by a low temperature segment followed by a segment of intermediate slope has proved to be very advantageous in practice. In the compensation segment the induction motor has entered the field weakening range in most applications, so that the torque decreases throughout the operating temperature range of the rotor and hence the increase of the number of revolutions becomes smaller. The motor reaches the desired operating speed at the end of the compensation segment, independently of the operating temperature.

In a attractive embodiment of the invention offers the inverter is always optimally used, i.e. either at its current limit or at its voltage limit.

The object with respect to the method is achieved according to the invention in that in order to start up the rotary anode to an operating speed a fixed, selectable starting up characteristic which is independent of the operating temperature of the rotor is provided as the frequency time characteristic, and that the starting up characteristic has at least a low-temperature segment and a high-temperature segment, the mean slope of the starting up characteristic in the low-temperature segment being optimized for the lower operating temperature range of the rotor while it is optimized for the upper operating temperature range of the rotor in the high-temperature segment.

BRIEF DESCRIPTION OF THE DRAWING

An embodiment of the invention will be described in detail hereinafter with reference to the FIGS. 1 to 5 of the drawing. Therein:

FIG. 4*a* shows the output voltage of the inverter,

FIG. 4*b* shows the speed of the induction motor,

FIG. 4*c* shows the phase-to-neutral current of the inverter, and

FIG. 4*d* shows the torque of the induction motor.

FIG. 5*a* shows the output voltage of the inverter,

FIG. 5*b* shows the speed of the induction motor,

FIG. 5*c* shows the phase-to-neutral current of the inverter, and

FIG. 5*d* shows the torque of the induction motor.

DETAILED DESCRIPTION OF THE PREFERRED EMBODIMENT

Figure 1:
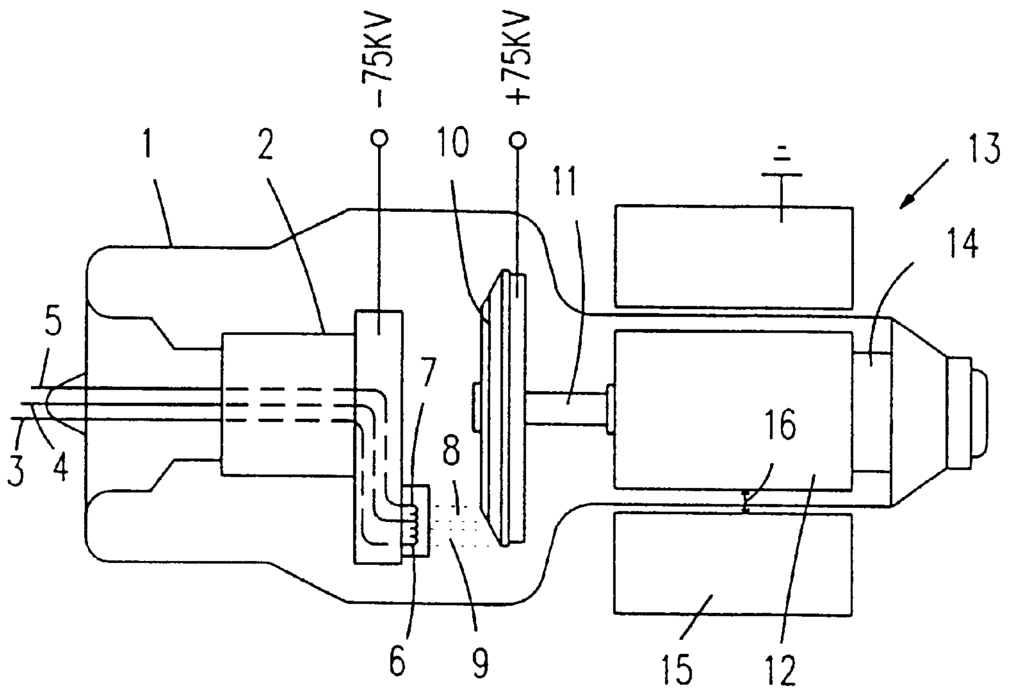
FIG. 1 shows a bipolar X-ray tube which includes a rotary anode which is driven by an induction motor.

FIG. 1 shows diagrammatically a bipolar X-ray tube provided with a vacuum envelope 1. The vacuum envelope 1 accommodates a cathode system 2 which includes three voltage leads 3, 4 and 5 which lead to filament cathodes 6 and 7. Depending on the connection of the voltage leads 3, 4 and 5, the electron ray 8 or 9 can be conducted from these filament cathodes 6 and 7 to a rotary anode 10. The cathode system 2 is coupled to a negative potential of, for example −75 kV.

The rotary anode 10 is connected, via a shaft 11, to a rotor 12 of an induction motor 13. The rotor 12 is journaled in a support 14. The rotor 12 is accommodated inside the vacuum envelope 1. The induction motor 13 is provided with a stator 15 which is arranged outside the vacuum envelope 1. The rotor 12 and the stator 15 of the induction motor 13 are separated by an air gap 16.

The rotary anode 10 and the rotor 12 are coupled to a high positive potential of, for example +75 kV, whereas the stator 15 is coupled to ground potential.

Figure 2:
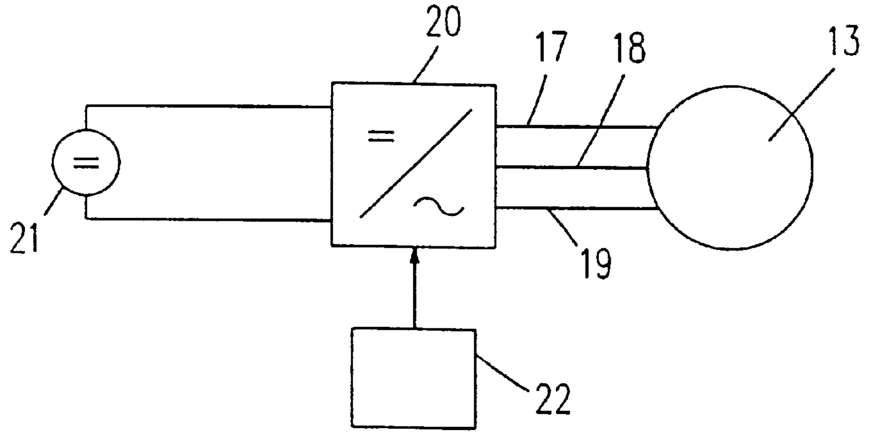
FIG. 2 shows diagrammatically the control of the induction motor of FIG. 1, the induction motor being coupled to an inverter whose switching frequency can be controlled by means of a control unit.

FIG. 2 shows a block diagram of the control or voltage supply of the induction motor 13 shown in FIG. 1. The induction motor 13 is constructed as a three-phase motor and hence has a first phase winding 17, a second phase winding 18 and a third phase winding 19. For the supply of voltages to the induction motor 13 there is provided an inverter 20 whose input side is connected to a DC voltage source 21 and whose output side is connected to the three phase windings 17, 18 and 19 of the induction motor 13. A control unit 22 is provided for control of the inverter 20. The inverter 20 includes switching elements (not shown) which can convert the DC voltage supplied by the DC voltage source 21 into alternating voltages of different frequency and amplitude. The switching frequency of the switching elements (not shown) of the inverter 20 are controlled by means of the control unit 22. The speed of the asynchronous motor 13 can be controlled by means of the frequency of its phase-to-neutral currents.

Figure 3:
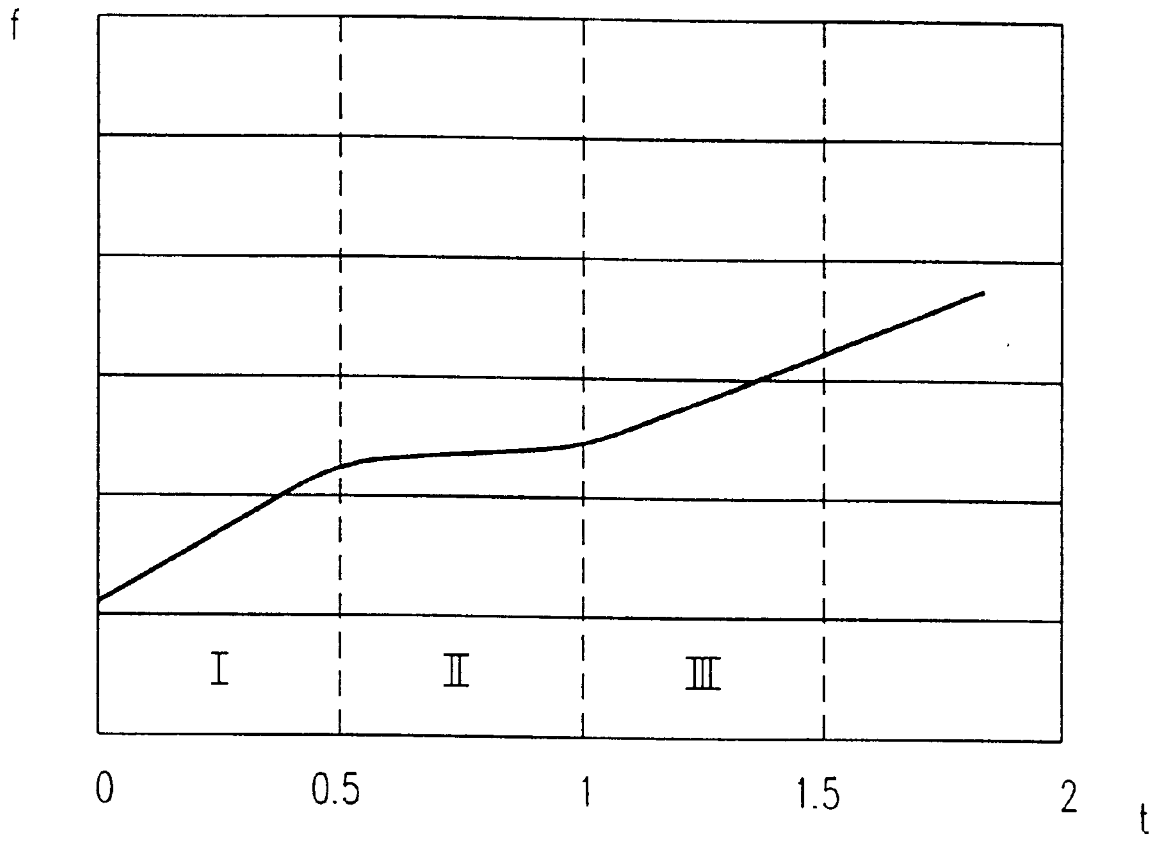
FIG. 3 shows a frequency time characteristic in the form of a starting up characteristic whereby the switching frequency of the inverter of FIG. 2 can be controlled, the starting up characteristic shown being intended for temperature-independent starting up of the rotary anode to an operating speed.

FIG. 3 shows a frequency time characteristic which will be referred to as starting up characteristic hereinafter. The starting up characteristic represents the switching frequency f of the inverter 20 of FIG. 2 during the starting time t specified for starting up the induction motor 13 from standstill to an operating speed. A typical example is that for a rotary anode of X-ray tubes it is desirable that the drive accelerates from standstill to at least 8000 rev./min. and at the most 9000 rev./min. within 1.8 s. The minimum number of revolutions is imposed so as to enable a minimum power to be converted in the tube. The highest number of revolutions is imposed so as to avoid mechanical problems (resonance, critical number of revolutions).

The starting up characteristic consists of three segments. The first segment in time is a high-temperature segment I in a range of from 0 to 0.5 s with a steep characteristic slope of, for example 130 Hz/s. The second segment in time is a low-temperature segment II in a range between 0.5 s and 1 s which has a comparatively moderate slope of, for example 20 Hz/s. A third segment in time, in a range from 1 s to 1.8 s, is a compensation segment with a slope of, for example 80 Hz/s. The mean slope of the starting up characteristic in the compensation segment III thus lies between the mean slope of the starting up characteristic in the high-temperature segment I and the mean slope of the low-temperature segment II.

Figure 4A:
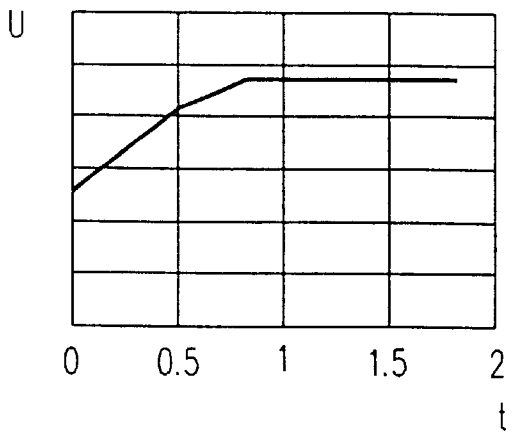
FIGS. 4*a* to 4*d* show various variables occurring during the starting-up time of a hot induction motor with a rotor temperature of 350° C.
Figure 4B:
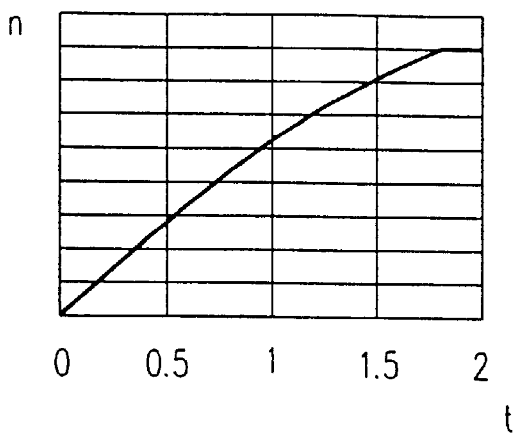
Figure 4C:
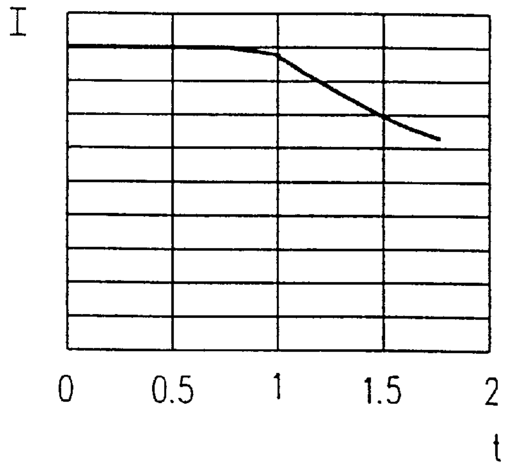
Figure 4D:
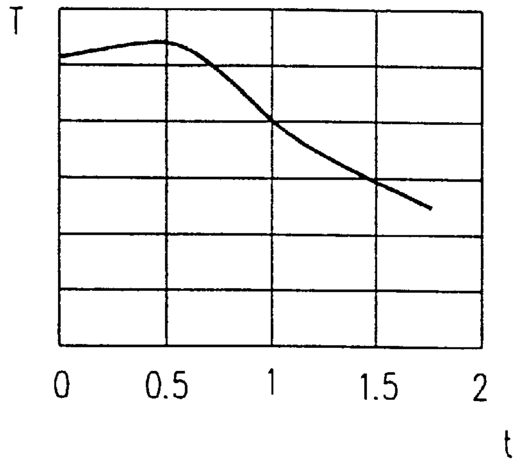

The starting up characteristic shown in FIG. 3 is intended for all operating temperatures of the rotor 12. FIGS. 4*a* to 4*d* show, as a function of time, various variables occurring during the starting up of a hot induction motor 13 with a rotor temperature of 350° C. FIG. 4*a* shows the output voltage U of the inverter 20 as a function of the starting up time t; FIG. 4*b* shows the speed n of the induction motor 13 as a function of the starting up time t; FIG. 4*c* shows the phase-to-neutral current I of the inverter 20 as a function of the starting up time t, and FIG. 4*d* shows the torque T of the induction motor 30 as a function of the starting up time t. FIGS. 5*a*, 5*b*, 5*c* and 5*d* show the same variables for a cold induction motor 13 with a rotor temperature of 20° C.

The behavior of the induction motor 13 during starting up will be described in detail hereinafter on the basis of the characteristics of the FIGS. 3, 4*a* to 4*d* and 5*a* to 5*d*, and with reference to the individual segments of the characteristic.

During the first high-temperature segment I in time the slope of the starting up characteristic of FIG. 3 is adjusted so that the drive has a constant high torque T for a high rotor temperature of 350° C. This can be seen in FIG. 4*d*. The slope of the starting up characteristic of FIG. 3 has been adapted to the motor with a high temperature in the high-temperature segment I. Because the characteristic thus has not been adapted to the cold motor with a rotor temperature of 20° C., the torque T of the cold motor drops as a function of time t during the high-temperature segment I. This can be seen in FIG. 5*d*. Consequently, at the end of the high-temperature segment I the motor with a higher temperature will have a higher speed n than the motor with a lower temperature (see FIGS. 4*b* and 5*b*).

Figure 5A:
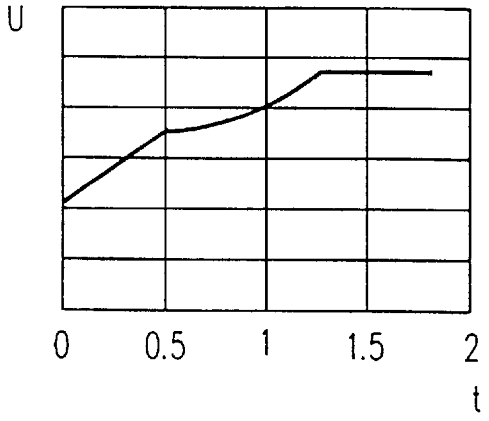
FIGS. 5*a* to 5*d* show various variables occurring during the starting-up time of a cold induction motor with a rotor temperature of 20° C.
Figure 5B:
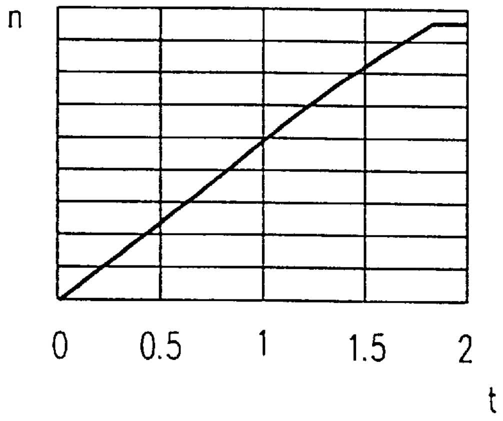
Figure 5C:
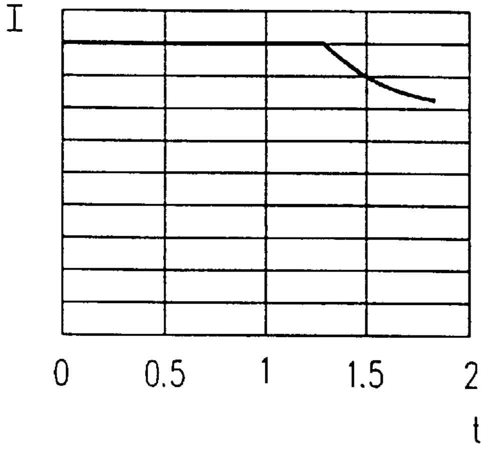
Figure 5D:
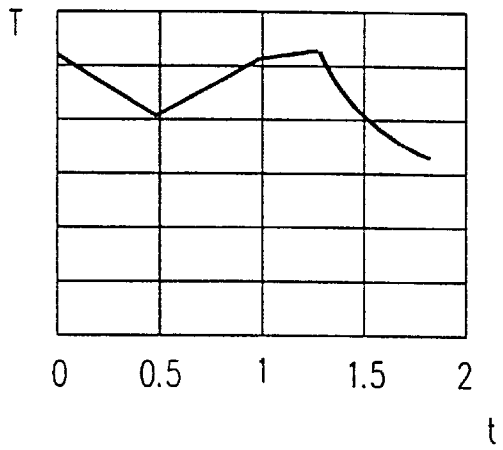

During the subsequent low-temperature segment II the starting up characteristic of FIG. 3 is adjusted so that the torque T increases in the motor with a lower temperature, as shown in FIG. 5*d*, whereas for the motor with a higher temperature it decreases, as shown in FIG. 4*d*, due to the fact that the starting up characteristic has not been adapted to this high temperature.

The slope of the compensation segment III of the starting-up characteristic of FIG. 3 is chosen so that after 1.8 s the speed n of the rotor lies in a range between 8000 rev./min. and 9000 rev./min. (FIGS. 4*b*+5*b*) in case of the low rotor temperature of 20° C. as well as in the case of the high rotor temperature of 350° C.

The output voltage U of the inverter, shown as a function of the starting up time t in the FIGS. 4*a* and 5*a*, is controlled in such a manner that the maximum permissible phase-to-neutral current I for the inverter flows for as long as possible. In the high-temperature segment I and the low-temperature segment II the inverter is driven to operate at the current limit in the case of the cold motor in conformity with FIG. 4*c* as well as in the case of the hot motor in conformity with FIG. 5*c*. At the end of the low-temperature segment II, the output voltage U of the inverter reaches the maximum voltage U available in the case of a hot motor in conformity with FIG. 4*a*, so that subsequently for the hot motor of FIG. 4*c* the phase-to-neutral current I decreases because the switching frequency f is increased further.

For the cold motor the output voltage U of the inverter reaches the maximum available output voltage during the compensation segment III after approximately 1.25 s. The phase-to-neutral current I of the inverter subsequently decreases also for the cold motor.

When the output voltage U of the inverter reaches the maximum voltage available, the induction motor subsequently enters the field weakening range, because the switching frequency f of the inverter must be further increased so as to reach the desired final speed. Consequently, subsequently the torque T decreases and hence the relative speed increase becomes smaller.

What is claimed is:

1. A drive device for a rotary anode of an X-ray tube comprising an induction motor whereto an alternating voltage can be applied by means of an inverter, and a control unit for controlling the inverter, the switching frequency of the inverter being variable in time, in conformity with a frequency time characteristic, by means of the control unit, wherein in order to start up the rotary anode to an operating speed a fixed, selectable starting up characteristic which is independent of the operating temperature of the rotor is provided as the frequency time characteristic, and wherein the starting up characteristic has at least a low-temperature segment and at least a high-temperature segment, the mean slope of the starting up characteristic in the low-temperature segment being optimized for a lower operating temperature range of the rotor while it is optimized for an upper operating temperature range of the rotor in the high-temperature segment.

2. A drive device as claimed in claim 1, wherein a first segment in time of the starting up characteristic is the high-temperature segment and a second segment in time is the low-temperature segment.

3. A drive device as claimed in claim 2, wherein the starting up characteristic comprises three segments, the first segment in time being the high-temperature segment, the second segment in time being the low-temperature segment, and the third segment in time being a compensation segment, the mean slope of the starting up characteristic of the compensation segment lying between the mean slope of the starting up characteristic of the high-temperature segment and the mean slope of the starting up characteristic of the low-temperature segment.

4. A drive device as claimed in claim 1, wherein the output voltage of the inverter can be controlled by means of the control unit, and wherein the output voltage is adjusted to the maximum available voltage for as long as a phase-to-neutral current is below the current limit of the inverter, and wherein above the current limit the voltage of the inverter is controlled in such a manner that the maximum permissible phase-to-neutral current flows.

5. A drive device as claimed in claim 3, wherein the durations of the first segment, the second segment and the third segment of the starting up characteristic are each between 20% and 50% of the starting up time.

6. A drive device as claimed in claim 3, wherein the mean slope of the starting up characteristic in the first segment as well as the mean slope of the starting up characteristic in the third segment is at least three times greater than the mean slope in the second segment.

7. An X-ray apparatus comprising a rotary anode X-ray tube and a drive device as claimed in claim 1.

8. A method of controlling a drive device of a rotary anode of an X-ray tube, which drive device includes an induction motor which is fed via an inverter, the switching frequency of the inverter being variable in time, comprising the step of controlling the inverter in conformity with a frequency time characteristic by means of a control unit, wherein in order to start up the rotary anode to an operating speed a fixed, selectable starting up characteristic which is independent of the operating temperature of the rotor is provided as the frequency time characteristic, and wherein the starting up characteristic has at least a low-temperature segment and a high-temperature segment, the mean slope of the starting up characteristic in the low-temperature segment being optimized for a lower operating temperature range of the rotor while it is optimized for an upper operating temperature range of the rotor in the high-temperature segment.

* * * * *